Nov. 23, 1965 V. L. OTT ETAL 3,218,789
LAWN EDGE AND HEDGE TRIMMER
Filed Oct. 12, 1962
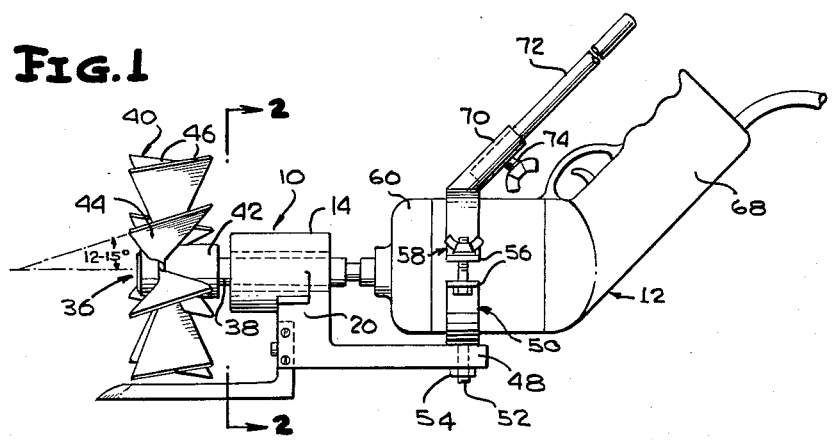
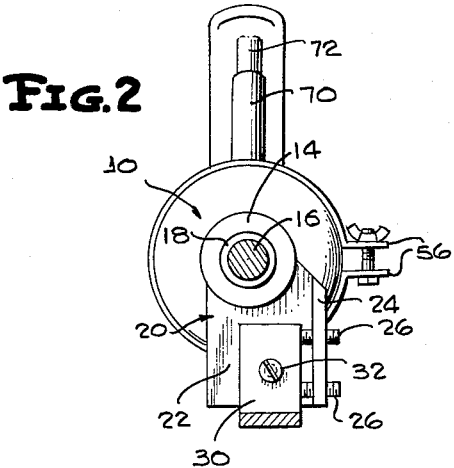
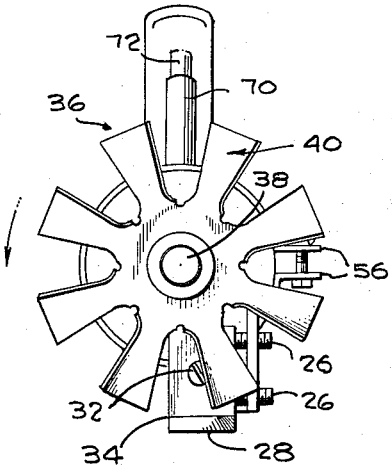
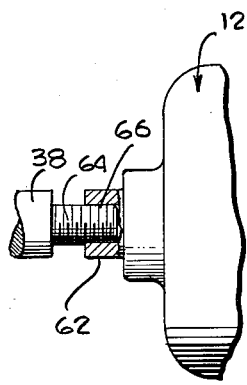
INVENTORS
JOHN B. BEAMAN Jr.
& VIVIAN L. OTT
BY
Shoemaker and Mattare
ATTORNEYS

3,218,789
LAWN EDGE AND HEDGE TRIMMER
Vivian L. Ott, 6100 Sylvan Ave., Norfolk, Va., and John
Branch Beaman, Jr., 815 Church St., Ahoskie, N.C.
Filed Oct. 12, 1962, Ser. No. 230,144
1 Claim. (Cl. 56—249)

This invention relates generally to tools or implements for gardening use and is directed more particularly to an improved device for facilitating the trimming of lawn edges and hedges.

In the caring for lawns there is always a considerable amount of touching up required to be made along the edges of walkways, near walls, and in other locations where large lawn cutting machines cannot be satisfactorily employed and consequently the gardner must use some type of small hand cutter. In the use of such a hand cutter constant kneeling or bending is usually required and this, of course, is very tiring.

In view of the foregoing it is a particular object of the present invention to provide a trimming device which can be made relatively light in weight and which can be easily manipulated by a gardener while in a standing position whereby the cutting or trimming of grass along the edges of walkways and in other places, such as adjacent to hedges, can be effectively accomplished.

It is another object of the present invention to provide a trimmer device which can be conveniently used for the edge trimming of lawns as above stated and which can also be easily converted to a hedge trimmer.

A still further object of the invention is to provide a novel trimming device designed to be operated by a conventional electric drill unit and wherein such drill unit can be detached from the cutter elements of the device, if desired, for other use.

Still another object of the invention is to provide a cutting apparatus designed for use as a lawn edge trimmer or a hedge trimmer, having a series of rotary cutting blades operating in conjunction with a cutter bar, wherein the cutting edges of the cutting blades are disposed at a predetermined angle, or at an angle within a small range, with respect to the axis of rotation and consequently with respect to the cutting edge of the cutter bar, whereby the maximum and most efficient cutting action of the tool is obtained.

The invention broadly contemplates the provision of a body member formed with a bore providing a bearing for a rotary shaft or in which such bore may have set a bearing sleeve of suitable material.

The body has formed integral therewith a bracket member to which a relatively long cutter bar is adjustably attached and which cutter bar extends forwardly of the body in parallel relation with the said bore or bearing sleeve.

The bracket also has formed integrally therewith and with the body, a rearwardly extending support arm carrying a split band. The split band is designed to encircle the housing of a conventional electric drill motor and the band is secured to the support arm whereby the electric drill motor may be maintained in a position with the armature shaft of the motor directed forwardly in coaxial alignment with the bearing or bore of the body.

Extending through the bearing of the body is a shaft carrying upon its forward end a series of radially extending cutter blades having outer end cutting edges designed to sweep across the cutting edge of the fixed or stationary cutter bar for cooperative cutting relationship with the bar.

The outer end cutting edges of the blades are set at angle to the axis of rotation of the supporting shaft and also, of course, to the longitudinal cutting edge of the cutter bar, which angle is approximately 12 to 15°.

The motor securing band carried by the supporting arm, also has formed integrally therewith, an upwardly and rearwardly directed socket in which an end of a handle may be secured and by means of which handle the machine may be easily manipulated by a person in a standing position. Means is provided for the ready detachment of the handle from the motor band whereby the motor, being of the conventional type having a pistol grip for facilitating the handling thereof, can be readily held in the hand with the cutter unit, for use as a hedge trimmer.

The invention will be best understood from a consideration of the following detailed description taken in connection with the accompanying drawings, wherein:

FIG. 1 is a view in side elevation of the lawn edge and hedge trimmer constructed in accordance with the present invention.

FIG. 2 a sectional view taken substantially on the line 2—2 of FIG. 1.

FIG. 3 is a view in front elevation of the trimmer.

FIG. 4 is a sectional detail, taken on an enlarged scale, showing the threaded connection between the cutter blade shaft and the motor armature shaft.

Referring now more particularly to the drawings wherein like numerals of reference designate corresponding parts throughout the several views, the numeral 10 generally designates the body of the device which carries the fixed and rotary cutter elements and to which the electric drill unit or motor is attached and which electric drill unit or motor is generally designated 12.

The body 10 of the device comprises the elongated cast body portion 14 which may be formed of any suitable material. This body portion 14 has formed longitudinally therethrough, a bore 16, the surface of which may be employed, if desired, as the bearing surface for the hereinafter described shaft or the bore 16 may have fixed therein a suitable bearing sleeve such as that shown and indicated by the reference character 18.

Formed integrally with the body portion 14 and preferably at the rear end thereof, is the depending bracket 20 which has the forwardly directed vertical face 22.

At one side of the bracket 20 and laterally offset with respect to the bearing 18, is the vertical forwardly projecting flange 24, in which are adjustably mounted or located the vertically spaced adjustment set screws 26. These set screws are directed transversely of the flange and would be substantially horizontally disposed in the working position of the device.

The numeral 28 generally designates an elongate cutter bar having at one end the right angularly extending arm 30 which is vertical and extends upwardly from the top surface of the bar when the cutter bar is mounted in working position as illustrated. This arm 30 is designed to be positioned against the face 22 of the bracket 20 and is secured to the bracket by the machine screw 32 or by any other suitable holding means, which is threaded into the bracket 20, and which, in addition to holding the cutter bar in working position, also forms a pivot upon which the cutter bar may be rocked as may be necessary to bring the cutting edge of the cutter bar into proper position for cooperation with the hereinafter described rotary cutter blades.

The cutting edge of the bar 28 is designated 34.

One vertical side edge of the cutter bar 30 is disposed adjacent to the inner face of the flange 24 in position to be contacted by the inner ends of the adjustment set screws 26. As shown these set screws are located one above and the other below the plane of the machine screw 32 whereby manipulation of the set screws will enable the user of the device to turn or oscillate the cutter bar to bring the cutting edge 34 thereof into the desired working position.

The numeral 36 generally designates the rotary cutting unit which operates in cooperation with the bar 28. This unit comprises the shaft 38 which is mounted in the bearing 18.

Upon the forward end of the shaft 38 there is fixed the multiple blade assembly which is generally designated 40 which comprises a hub 42 in which the forward end of the shaft 38 is received, and the plurality of sweep blades 44 which extend radially of the hub.

Each of the sweep blades 44 has a wide or broad outer end cutting edge 46 and the blades are set so that the cutting edges thereof will be disposed at an angle of from 12 to 15° to the axial center of the hub 42.

The cutter bar 28 is positioned on the bracket 20 to dispose the cutting edge 34 at the proper location with respect to the axis of rotation of the sweep blades so that as the blades sweep downwardly and move across the cutter edge, they will pass very close to or lightly engage the cutter edge so as to effect the cutting of any vegetation interposed between the edge 34 of the bar 28 and the edges 46 of the sweep blades.

The bracket 20 has secured thereto or, preferably formed integral therewith, the rearwardly projecting support arm 48.

Spaced a substantial distance rearwardly of the body portion 14, the support arm 48 has mounted thereon a split band 50. This band is secured in a suitable manner to the arm 40 as, for example, the band may carry a threaded stud 52 extending downwardly through the arm and having a nut 54 threaded thereon, or any other suitable means may be employed for mounting the band in the upright position shown.

The split band 50 has the usual spaced terminal ears 56 which may be coupled and drawn together by a suitable threaded bolt and wing nut assembly 58.

The band 50 is of a suitable diameter to encircle the body or casing 60 of the electric drill motor 12 and when the motor is secured in the band in the manner shown, the armature shaft of the motor, the forward end portion of which shaft is shown and designated 62, will be aligned with the rear end of the sweep blade assembly supporting shaft 38.

The rear end of the shaft 38 is coupled, in a suitable manner, with the armature shaft 62 of the motor. The coupling means here shown comprises a threaded extension 64 on the rear end of the shaft 38 which is receivable in a threaded socket 66 in the forward end of the motor shaft 62. However, any suitable means may be provided for establishing the desired connection between these shafts and such connection should be of a character which will facilitate the ready disconnection of the motor from the shaft 38 so that the motor may be used for other purposes if desired.

As illustrated the drill motor 12 is of the type having a pistol grip 68 type of handle which preferably is positioned to extend upwardly and rearwardly in FIG. 1.

Upon the top of the motor securing band 50 there is formed a socket member 70. This member 70 is fixed to the band so as to extend upwardly and rearwardly at a suitable angle whereby when the handle 72 is attached to the socket it will be conveniently disposed for use in manipulating or handling the trimmer device.

While the handle 72 may be attached to the socket in any suitable manner, it is preferred that it be secured by means of a set screw 74 engaging the lower end of the handle when the latter is introduced or fixed in the socket.

The trimmer device may be made relatively light in weight so that it can be readily handled or moved about by a person grasping the handle 72. However, if desired, a suitable means may be provided for mounting the device on or attaching to the device, a ground engaging supporting wheel.

When the trimmer device is desired for use as a hedge trimmer the handle 72 may be removed and in order to make handling of the device more convenient, the motor unit 12 may be turned or rotated a half turn within the band 50 so to bring the hand grip 68 into a downwardly angled position or, in other words, to a position opposite from the position in which it is shown in FIG. 1.

The multiple blade assembly 36 may be, and preferably is, formed by stamping from a sheet of metal of desired gauge and type.

From the foregoing it will be apparent that there is provided by the present invention a novel trimmer device which is of relatively simple construction but which can be operated efficiently for the trimming of grass along the edges of walkways and in other positions where heavier mowing machines do not operate satisfactorily. Also, as described, the device can be readily converted to use as a hedge trimmer or a trimming device for other light shrubbery.

As this invention may be embodied in several forms without departing from the spirit or essential characteristics thereof, the present embodiment is therefore illustrative and not restrictive, since the scope of the invention is defined by the appended claim rather than by the description preceding them, and all changes that fall within the metes and bounds of the claim or that form their functional as well as cojointly cooperative equivalents, are therefore intended to be embraced by the claim.

We claim:

A power drill attachement for trimming grass, hedge and the like comprising an elongate body member having a longitudinal bore extending therethrough, bearing means within said bore for the reception of a rotatable shaft, said body member further comprising a radial flange at a first end thereof, a second flange connected to and normal to said first flange and extending in a forward direction generally toward the second end of said body member parallel to the axis of said bore, said second flange having two threaded passageways through the wall thereof, two elongate threaded means positioned in said passageways, said first flange having a forward surface normal to the axis of said bore, a third flange extending opposite to said first direction from said first flange and being disposed normal to said first and second flanges, a split band clamp secured to the free end portion of said third flange, said split band clamp having a handle receiving connection means located opposite said third flange, a handle disposed in and connected to said connection means and secured thereon by suitable means, an elongate cutter bar having an L-shaped cross section, one arm of said elongate cutter bar being adjustably secured to said forward face of said first flange with a portion thereof engaged by said two elongate threaded means, the other arm of said cutter bar having a shearing edge disposed parallel to the axis of said bore, said shearing edge being located forward of the second end of said bore, a shaft positioned in said elongated bore supported by said bearing means and extending forward thereof, a cutter unit on the forward end of said shaft and rotatable therewith and including blades extending radially of said shaft and having transverse outer end cutting edges positioned to sweep across the edge of said cutter bar.

References Cited by the Examiner

UNITED STATES PATENTS

| | | | |
|---|---|---|---|
| 2,211,671 | 8/1940 | Reed | 230—120 |
| 2,500,071 | 3/1950 | Hans | 230—134 |
| 2,629,220 | 2/1953 | Grieder. | |
| 2,782,587 | 2/1957 | Ott | 56—249 |
| 2,814,924 | 12/1957 | Group et al. | 56—25.4 |
| 2,867,040 | 1/1959 | Mertesdorf | 30—240 |
| 2,869,309 | 1/1959 | Benson | 56—294 X |
| 2,932,144 | 4/1960 | Garner et al. | 56—25.4 |
| 2,946,172 | 7/1960 | Hale et al. | 56—25.4 |
| 3,017,733 | 1/1962 | Evans | 56—25.4 |
| 3,106,251 | 10/1963 | Lucas. | |

ANTONIO F. GUIDA, *Acting Primary Examiner.*

RUSSELL R. KINSEY, T. GRAHAM CRAVER,
*Examiners.*